United States Patent
Movall et al.

(12)

(10) Patent No.: US 6,219,761 B1
(45) Date of Patent: Apr. 17, 2001

(54) LOAD/STORE ASSIST ENGINE

(75) Inventors: Paul Edward Movall; Charles Scott Graham, both of Rochester; Shawn Michael Lambeth, Pine Island; Daniel Frank Moertl, Rochester, all of MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/072,740

(22) Filed: May 6, 1998

(51) Int. Cl.[7] .......................... G06F 13/28; G06F 15/00; G06F 12/00

(52) U.S. Cl. .................. 711/141; 710/22; 710/33; 710/56; 712/1; 712/35

(58) Field of Search .................. 395/800, 876, 395/425, 468; 712/35, 1; 710/33, 56, 22; 711/141

(56) References Cited

U.S. PATENT DOCUMENTS

| | | | |
|---|---|---|---|
| 5,251,322 | * 10/1993 | Doyle et al. | 712/1 |
| 5,293,606 | * 3/1994 | Sassenrath | 710/33 |
| 5,392,448 | * 2/1995 | Frankel et al. | 712/35 |
| 5,524,233 | * 6/1996 | Milburn et al. | 711/141 |
| 5,732,285 | * 3/1998 | Harrison et al. | 710/56 |
| 6,055,583 | * 4/2000 | Robbins | 710/22 |

OTHER PUBLICATIONS

I$_2$O Technology Backgrounder p.p.1–6, Printed Feb. 20, 1998 from World Wide site www.i2osig.org/Architecture/TechBack.html.

B.E. Bakke et al., "Method For Atomic Peer–To–Peer Communication on a Peripheral Component Interconnect Bus", *IBM Technical Disclosure Bulletin*, vol. 39, No. 1, Jan. 1996 pp.

* cited by examiner

*Primary Examiner*—Matthew Smith
*Assistant Examiner*—Jibreel Speight
(74) *Attorney, Agent, or Firm*—Birch, Stewart, Kolasch & Birch

(57) ABSTRACT

An input/output bus architecture that includes: an input/output bus; an input/output device connected to the input/output bus; a main processor, connected to the input/output bus, for executing a device driver corresponding to the input/output device, the device driver generating load/store commands for the input/output device; and a load/store assist engine, connected to the input/output bus and yet independent of the main processor, for loading/storing data to/from the input/output device according to the load/store commands from the device driver. The load/store assist engine decouples the main processor from latencies associated with execution of the load/store commands. The device driver is reassigned to the main processor, rather than being found in a device that is external to the main processor, such as an input/output processor.

16 Claims, 7 Drawing Sheets

FIGURE I (PRIOR ART)

| Function | Methodology | | |
|---|---|---|---|
| | Prior Art Direct (no external IO) | Prior Art External IO Processing | LSAE |
| Register Reads/Writes | Performed by main processor | Performed by IO processor | Performed by LSAE (or selectively by main processor depending on hardware configuration) |
| Interrupt Processing | Performed by main processor | Performed by IO processor | Performed by main processor |
| Device Driver Execution | Performed by main processor | Performed by IO processor | Performed by main processor |
| Protocol Stack Execution | Performed by main processor | Performed by IO processor or Performed by main processor | Performed by main processor |

FIGURE 7

LOAD/STORE ASSIST ENGINE

FIELD OF THE INVENTION

The invention is directed to the field of input/output processing, and more particularly to input/output processing that is external to a main processor.

BACKGROUND OF THE INVENTION

Input/output processing concerns the movement of data to/from devices, e.g., nonvolatile storage devices such as an optical disk, fixed magnetic disk or floppy magnetic disk, that are external to a processor complex. Originally, input/output processing was handled by the processor complex. FIG. 1 is a hardware diagram corresponding to this situation.

In FIG. 1, a processor complex 102 is connected to input/output adapters 106 by an input/output bus 104. Load/store commands and interrupt signals 108 are exchanged between the processor complex 102 and the input/output adapters 106. An input/output adapter 106 connects an input/output device (not shown) to the input/output bus 104. The processor complex 102 typically includes a processor (not shown), a memory controller (not shown) and a bus controller (not shown). The bus controller typically generates and manages communication over the input/output bus. In particular, the bus controller handles interrupt management, e.g., by providing a mapping from a physical input/output bus slot to an interrupt bit.

FIG. 2 depicts a functionality diagram corresponding to FIG. 1. The device driver functionality 204, the protocol stack functionality 206, the application functionality 208 and the operating system services 210 are performed by the processor complex 102, as indicated by the dashed box 202. The input/output adaption functionality 212 is performed by an input/output adapter 106.

In input/output request processing data flow path 216 has been depicted between the application functionality 208 and the input/output adaption functionality 212. An input/output request is initiated, either directly or indirectly, by the application 208. This input/output request is processed by the protocol stack 206, which converts the generic input/output request of the application 208 into a specific command protocol for a peripheral device, such as disk memory or a communications link such as TCP/IP. The protocol stack 206 may use various services that are provided by the operating system 210.

In a system with no external input/output processing such as in FIG. 1, the protocol stack 206 queries the operating system 210 for a linkage to the device driver 204. Once this linkage is obtained, the protocol stack 206 directly calls the services provided by the device driver 204.

The device driver 204 is responsible for accepting a command from the protocol stack 206 and instructing the input/output adaption functionality 212, i.e., the input/output adapter 106, to perform the command. The device driver 204 has direct access to all of the registers in the input/output adapter 106 and directly loads data from or stores data to the register space (not depicted) of the adapter 106.

The situation depicted in FIGS. 1 and 2 is typical for personal computers (PCs). The input/output adapter 106 is totally managed by the processor complex 102, including programming the input/output adapter 106, using loads and stores, and responding to service requests from the input/output adapter 106 by way of either an interrupt or polling technique. Such programming and responding has been indicated via the signal paths 108.

Previously, the disparity between the processor complex cycle time and the input/output bus speed was small. If the processor complex had to wait for an input/output adapter 106 to respond to a load or store command, the wait was not very long, resulting in the processor complex 102 being stalled or unusable for only a few cycles.

As technology has progressed, processor complex cycle times have decreased to a much greater extent than input/output adapter response times. Consequently, the number of processor complex cycle times that were lost, due to being stalled while waiting for an input/output adapter to respond to a load or store command, grew as quickly as the processing speed of the processor complex.

As an example of the processor complex being stalled, consider a peripheral computer interface (PCI) input/output transaction on a local PCI bus for which the latency is 300 nanoseconds (nsec), and a processor cycle time of three nsec. In this situation, the processor will be stalled for 100 cycles to perform the input/output transaction. If the processor cycle time is decreased to one nsec, then the processor complex will be stalled for 300 cycles. As another example, in the case of a PCI input/output transaction on a remote PCI bus connected to a host PCI bus via a bridge for which the latency is two microseconds (u sec) and the processors' complex cycle time is three nsec, the processor complex suffers 666 wasted cycles. If the processor cycle time is decreased to one nsec, then the processor complex suffers 2000 wasted cycles.

To reduce the time that a processor complex was stalled due to an input/output command, the processor complex was programmed to perform other functions after issuing an input/output command. When the input/output adapter 106 finally responded, it regained the attention of the processor complex 102 by providing an interrupt signal. To service the interrupt, it was necessary for the processor complex to store its internal states concerning the process it was currently executing. Typically, three or four load/store commands were associated with an interrupt, and three or four interrupts were associated with each input/output command. Thus, though the technique of using interrupts solved the problem of the stalled processor complex, much useful work by the processor complex was consumed by the interrupt service routines that had to be executed.

To solve the problem of the processor complex having to service many interrupts, the responsibilities for performing the device driver functionality and servicing the interrupts from an input/output adapter were transferred to an input/output processor external to the processor complex. This situation is depicted in FIG. 3, where a processor complex 302 is connected to an input/output bus 304. An input/output processor 310 as well as input/output adapters 306 are also connected to the input/output bus 304. The processor complex 302 typically includes a processor (not shown), a memory controller (not shown) and a bus controller (not shown). The bus controller generates and manages the input/output bus 304, including providing a mapping from a physical input/output bus slot to an interrupt bit.

FIG. 4 is a functionality diagram corresponding to FIG. 3. The functions performed by the processor complex 302, as denoted by the dashed box 402, now only include the operating system services 406, the protocol stack 408 and the application 410. The device driver functionality 416 has been moved outside the processor complex 302 to the input/output processor 310, as is indicated by the dashed box 404, which also includes the input/output operating system services functionality 414. The processor complex functionalities 402 communicate with the input/output processor functionalities 404 via a message protocol 412. The input/output processor functionalities 404 communicate with the input/output adaption functionality 418 via an exchange of load/store commands and interrupts, as denoted by item 420.

As before, an input/output request processing data flow path 422 has been depicted between the application functionality 410 and the input/output adaption functionality 418. An input/output request is initiated, either directly or indirectly, by the application 410. This input/output request is processed by the protocol stack 408, which converts the generic input/output request into a specific command protocol for the peripheral device, such as a disk drive storage or a communications link, e.g., TCP/IP. The protocol stack 408 may use various services that are provided by the operating system 406.

The protocol stack 408 queries the operating system 406 for a connection to the device driver 416. This connection will permit command and response messages to flow between the protocol stack 408 and the device driver 416. Once this connection is established, the protocol stack 408 sends command messages to the device driver 416 via the operating system services 406.

The operating system services 402 transfer and receive the command and response messages from the protocol stack 408 to the input/output operating system services 414. The input/output operating system services receive and transfer these messages to or from the device driver 416. For every operation, both the operating system's services 406 and the input/output operating system services 414 are used to communicate the command and response.

The device driver 416 is responsible for accepting a command from the protocol stack 408 and instructing the input/output adapter 306 to perform the command. Typically, the device driver 416 has direct access to all of the registers (not shown) in an input/output adapter 306 and directly loads or stores data, i.e., reads or writes data, to the register space of the input/output adapter 306. Alternatively, part of the protocol stack 408 may be implemented as part of the input/output operating system services.

FIGS. 3–4 are typical of a PC server. The input/output processor 310 has been added to offload the control of the input/output adapter 306 from the processor complex 302. Such offloading is represented by the signal paths 308 and 312. The signal path 308 represents the exchange of load/store commands and interrupt information according to a message protocol between the processor complex 302 and the input/output processor 310. The signal path 312 represents the issuing of load/store commands and the responses in the form of interrupts between the input/output processor 310 and the input/output adapter 306. As an optional aspect, the processor complex 302 can retain the device driver functionality, as in FIGS. 1–2, and communicate directly with the input/output adapter 306, as represented by the signal path 314.

When this architecture was first being used, the input/output processor 310 serviced the three or four interrupts from an input/output adapter 306 associated with each input/output command. In turn, the input/output processor 310 generated only one interrupt to the processor complex 302 per input/output command. Thus, much useful work of the process complex 302 was no longer lost to the servicing of the other two or three interrupts.

Another trend in input/output processing has been for input/output adapters to generate one interrupt, rather than three or four interrupts, per input/output command. Consequently, an input/output processor must only service one interrupt request from an input/output adapter. The input/output processor 310 must then issue its own interrupt request to the processor complex 302. Thus, it is no longer necessarily true that the processor complex 302 is servicing fewer interrupts than the input/output processor 310. The benefit to using input/output processors has now become their ability to decouple the processor complex from the latencies associated with issuing the load/store commands to the input/output adapters and waiting for the typically single interrupt request response from the input/output adapter.

As is typical in the field of computer technology, changes in input/output adapter technology occur quickly. Such a change might be an increase in bandwidths of an Ethernet card from 10 megabits to 100 megabits. To respond to such a change, both the processor complex and the input/output processor must be adapted. Thus, two separate revisions must be designed and supported. Most likely, two separate sets of development tools, such as compilers, debuggers, etc., also must be developed. Such dual development is expensive.

SUMMARY OF THE INVENTION

The invention is based in part upon a recognition that it is no longer necessarily the case that an input/output processor reduces the number of interrupts that a processor complex must service in order to input/output data.

The invention is also based in part upon a recognition that if the device driver functionality of an input/output processor were separated from the input/output adapter interaction functionality of an input/output processor and moved back into the processor complex, then dual development costs could be eliminated.

The invention provides an inexpensive coprocessor, referred to as a load/store assist engine, that is external to the processor complex and which assists in performing register load and store operations. The load/store assist engine uses a high performance message-based facility, i.e., messaging protocol, to communicate with the host. Such a protocol requires the processing complex to perform no loads and very few, e.g., three, non-stalling and non-synchronized stores in order to cause the load/store assist engine to perform loads and stores to an input/output adapter. This frees the processor complex to perform usable work instead of being stalled waiting for the loads/stores to complete, i.e., for the input/output adapter to respond.

It is an object of the present invention to provide an input/output (I/O) bus architecture comprising:

an input/output bus; an input/output device connected to said input/output bus; a main processor, connected to said input/output bus, for executing a device driver corresponding to said input/output device, said device driver generating load/store commands for said input/output device; and a load/store assist engine, connected to said input/output bus and yet independent of said main processor, for loading/storing data to/from said input/output device according to said load/store commands from said device driver such that said load/store assist engine decouples said main processor form latencies associated with execution of said load/store commands.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 7 is a table comparing the prior art side-by-side against the load/store assist engine of the invention.

DETAILED DESCRIPTION OF THE PREFERRED EMBODIMENTS

Traditionally, designers of computer input/output architectures have been motivated to offload processing responsibilities from the processing complex to a local processor attached to the input/output bus. The invention reflects the recognition that the factors which supported the traditional design perspective for input/output architectures have changed, e.g., input/output commands now typically require one interrupt to be serviced rather than three or four. In addition, the rate at which peripheral devices and their associated input/output adapters improve, i.e., change, has made much more significant the dual development cost of updating an input/output processor as well as the processor complex so that they can take full advantage of the improvements in the peripheral devices.

The invention reflects the recognition that it has now become advantageous to reverse the trend in the prior art to offload the processor complex. The invention is a reflection of having loaded some processing responsibilities, e.g., the device driver, back onto the processor complex.

Figure 5:
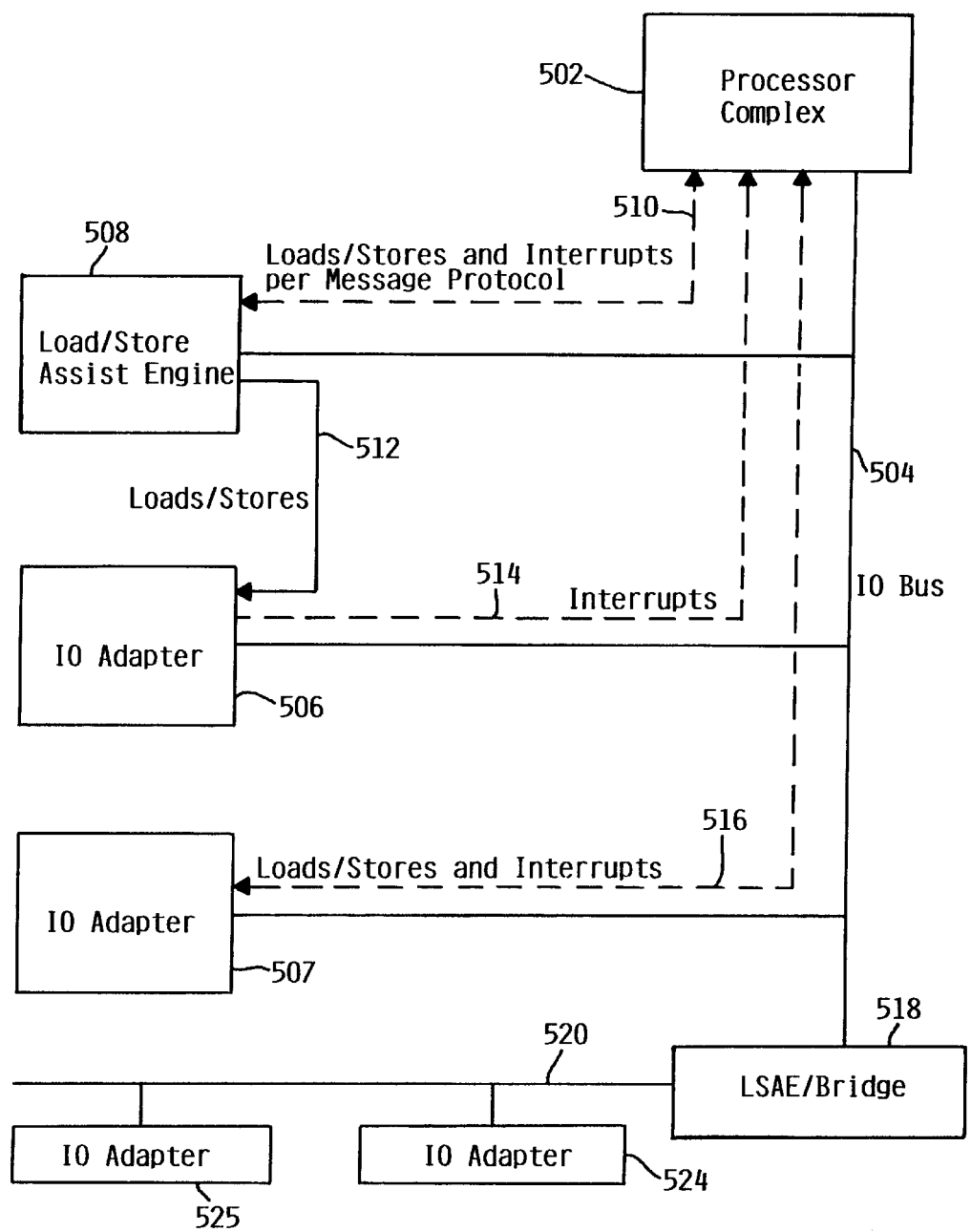
FIG. 5 is a hardware diagram of an input/output processing architecture according to the invention.

FIG. 5 is a hardware diagram according to the input/output processing architecture of the invention. In FIG. 5, a processor complex 502 preferably is connected to a memory-mapped input/output bus, e.g., a PCI bus. The processor complex 502 can include a processor (not shown), a memory controller (not shown) and a bus controller (not shown).

A load/store assist engine 508 and input/output adapters 506 507 are each connected to the input/output bus. The input/output adapters 506 507 are similar or equivalent to the prior art input/output adapters. A signal path 510 of FIG. 5 represents communication of load/store commands and interrupts between the processor complex 502 and the load/store assist engine 508 using a messaging protocol such as the message transport mechanism, which is the subject of related copending U.S. patent application Ser. No. 08/950, 593, filed Oct. 15, 1997, entitled "Message Transport Mechanism," to Nordstrom et al., the entire contents of Ser. No. 08/950,593 being hereby incorporated by reference.

An instruction path 512, in FIG. 5, goes from the load/store assist engine 508 to the input/output adapter 506. An interrupt signal path 514 goes from the input/output adapter 506 to the processor complex 502. Alternatively, instead of commands flowing from the processor complex 502 to an input/output adapter via the load/store assist engine 508, the processor complex 502 can communicate directly, such as over the bi-directional instruction and interrupt signal path 516 between the processor complex 502 and the input/output adapter 507.

An alternative to the load/store assist engine 508 is also depicted in FIG. 5 as the integrated load/store assist engine and bridge 518. The engine and bridge 518 connects the input/output bus 504 to another input/output bus 520, to which are attached the input/output adapters 524 and 525, which correspond to the input/output adapters 506 and 507, respectively.

Figure 6:
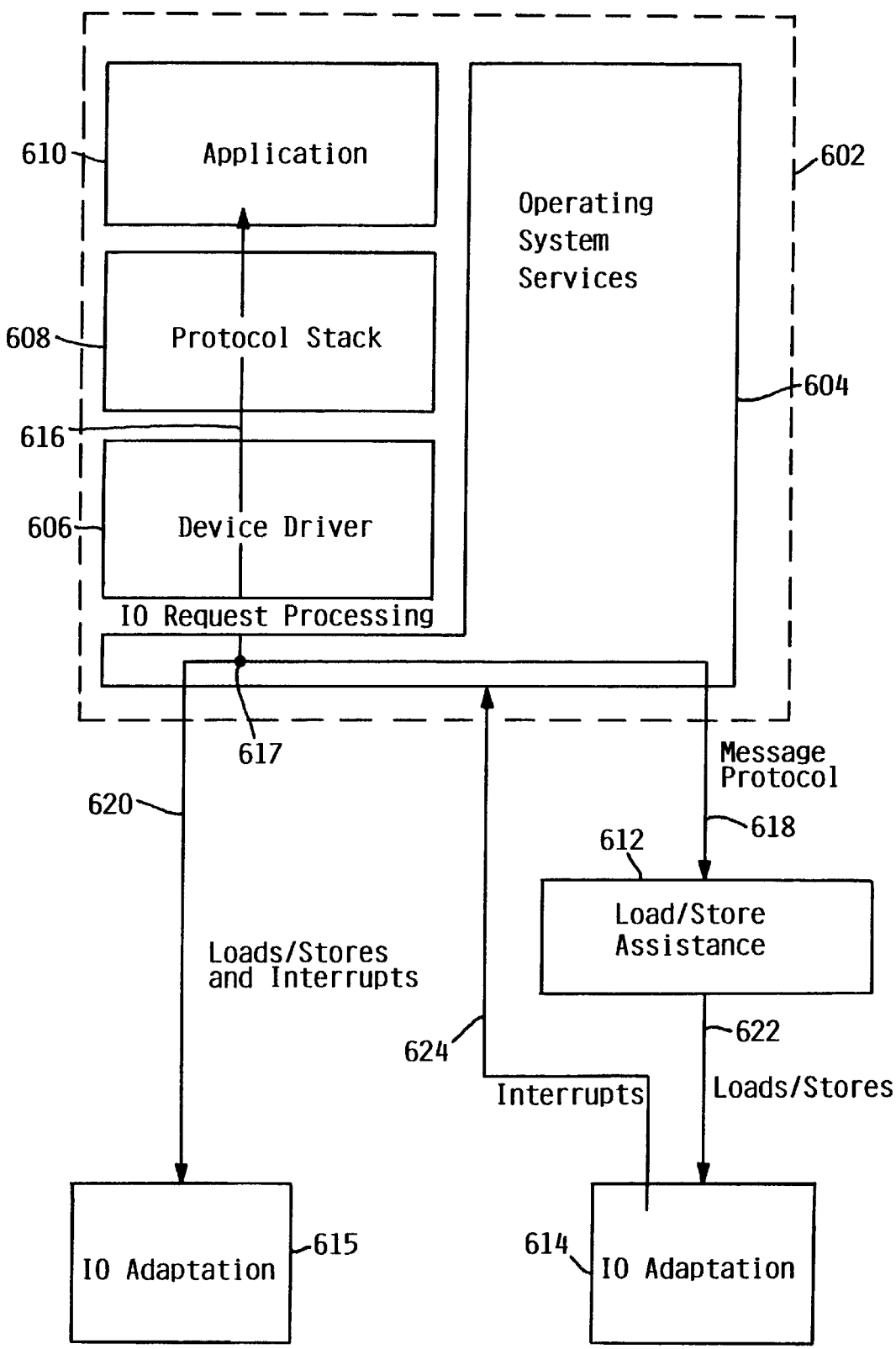
FIG. 6 is a functionality diagram for the invention, wherein FIG. 6 corresponds to FIG. 5.

FIG. 6 is a functionality diagram for the invention which corresponds to the hardware diagram of FIG. 5. In FIG. 6, the functions performed by the processor complex 502 are indicated by the dashed box 602 and include the operating system services 604, the protocol stack 608 and an application 610. In addition, in a reversal of the prior art trend, the invention reflects having returned the responsibility for performing the device driver functionality 606 to the processor complex 502 such that it is depicted within the dashed box 602. The load/store assist functionality 612 is independent of, and external to or outside, the processor complex functionalities 602. The input/output adaption functionalities 614 and 615 correspond to the input/output adapters 506 and 507 of FIG. 5, respectively.

The instruction signal path 510 of FIG. 5 corresponds to the signal path 616 and the message protocol path 618 connecting the application functionality 610 to the load/store assistance functionality 612. The command signal path 512 of FIG. 5 corresponds to the load/store command signal path 622 of FIG. 6. The interrupt signal path 514 of FIG. 5 corresponds to the interrupt signal path 624 of FIG. 6. The signal paths 616 and 618 are connected at the node 617. The alternative command signal path 516 of FIG. 5 corresponds to the signal paths 616 and 620, as connected at the node 617, of FIG. 6.

The functionality diagram corresponding to the integrated load/store assist engine and bridge 518 and the input/output adapters 524 and 525 have been omitted, for the sake of brevity, because they so similar to the functionality diagram of FIG. 6 and the corresponding discussion herein.

The bus controller (not shown) of the processor complex 502 generates and manages the input/output bus 504. The bus controller (not shown) typically includes a function for interrupt management that provides a mapping from physical input/output bus slots to interrupt bits. The invention assumes that the input/output bus 504 conveys loads/stores to/from the processor complex 502 and can convey interrupts to the processor complex 502, to control the flow of commands and data to/from the input/output adapters 506–507 and/or the load/store assist engine 508.

The input/output adapters 506 and 507 are logically managed by the processor complex 502. This includes programming the input/output adapters, issuing loads and stores via the load/store assist engine 508 in the case of the input/output adapter 506, and responding to service request from the input/output adapters using either an interrupt or polling technique.

In operation, an input/output request is initiated, either directly or indirectly by the application 610. This input/output request is processed via the protocol stack 608, which converts the generic input/output request into a specific command protocol for a peripheral device, such as a disk drive memory or other remote memory or a communications link such as TCP/IP. The protocol stack may use various services that are provided by the operating system.

The protocol stack 608 queries the operating system 604 for a linkage to the device driver 606. Once this linkage has been obtained, the protocol stack 608 directly calls the services provided by the device driver 606.

The device driver 606 is responsible for accepting a command from the protocol stack 608 and instructing the input/output adaption 614 to perform the command. When using the load/store assistance functionality 612, the device driver 606 does not have direct access to the register space (not shown) in the input/output adaption 615, but instead uses operating system services to perform load or store operations to the register space (not shown) of the input/output adaption 615. In this manner, the operating system 604 sends a list of load and store commands to the load/store assistance functionality 612 for processing in situations where high latency is associated with the input/output adapter 506.

The load/store assistance functionality 612 accepts the list of load and store commands, processes them by sending to or receiving from the input/output adaption 614, and returns the load data to the operating system 604 in the case of a load command. Any changes in the control flow of the input/output adaption functionality 614, such as the generation of an interrupt, are routed directly to the processor complex 502 rather than via the load/store assistance 612.

The load/store assist engine 508 is implemented, e.g., by a programmed processor, a programmable logic array or an application specific integrated circuit that corresponds to the programmed processor. It is well within the ordinary level of skill in the art of input/output processors to eliminate the device driver functionality from the prior art input/output processor 310 in order to produce the load/store assist engine 508 taking the form of a programmed processor. Moreover, it is a simple matter to program a programmable logic array once the code of a corresponding programmed processor has been determined. However, until the code of the programmed processor has been seasoned so that the probability of revisions is low, it is not cost effective to use programmable logic arrays rather than programmed processors to implement the load/store assist engine.

Returning briefly to the alternative embodiment of the invention, a bridge connects a first input/output bus to a second input/output bus. Where the first and second buses are the same, the bridge provides additional fan out, thus acting as a sophisticated buffer or redrive device. Where the first input/output bus is different than the second input/output bus, the bridge acts as a converter between the two buses. In the alternative form of the invention, namely the integrated load/store assist engine and bridge 518, the bridge portion acts as either a redrive device in the case in which the input/output bus 520 is the same as the input/output bus 504, e.g., a PCI bus, or as a converter in the case that the input/output bus 520 is different than the input/output bus 504, e.g., an extended industry standard architecture bus. Because the input/output adapters 524 and 525 correspond to the input/output adapters 506 and 507, respectively, signal paths for the input/output adaptors 524 and 525 corresponding to the paths 510, 512, 514 and have been omitted from FIG. 5 for the sake of simplicity.

There will be some peripheral devices which have very low latency. Such devices justify attachment to the input/output bus 504 via the input/output adapter 507. This alternative recognizes that there are some performance costs or overhead, associated with the use of the load/store assist engine. Where a direct connection via the input/output adapter 507 yields at least comparable performance to the use of the load/store assist engine 508, it is worthwhile to bypass the load/store assist engine 508.

The decision to bypass the load/store assistance functionality 612 of FIG. 6 is made independently of the device driver 606, i.e., it is made at node 617 by one of the operating system services 604 after the device driver is finished sending a communication to the peripheral device. Once the device driver calls the operating system services 604, the device driver assumes that its commands will be delivered to the peripheral device but cares not by what path the commands are delivered.

To initiate a load/store command, the processor complex 502 issues an interrupt to the load/store assist engine 508 in order to send the load/store command thereto. In the case of a load command, the processor complex provides a target address and an instruction code, a doublet, to the load/store assist engine 508. In the case of a store command, the processor complex 502 provides a target address, an instruction code and datum, together referred to as a triplet, to the load/store assist engine 508. However, no peripheral device-specific information is provided to the load/store assist engine 508. Alternatively, the load/store assist engine 508 may be provided with a string of load/store commands, rather than one. The load/store assist engine 508 will directly perform the load/store of data from/to the register space of the input/output adapter 506, as specified by the processor complex 502. When the load/store command or string of load/store commands is complete, the load/store assist engine 508 will generate an interrupt to the processor complex 502, and present any retrieved data for load commands.

The input/output device 506 is instructed to perform an I/O operation through a series of loads and stores from the load/store assist engine 508. After a delay associated with the basic operation of the peripheral device (not shown) to which the input/output adapter 506 is connected, the operation will be complete. In some contexts, an interrupt may be generated from the input/output adapter 506 to the processor complex 502 to notify it that the I/O operation has been executed. Thus, to execute some device operations using the load/store assist engine, it would be necessary for the processor complex 502 to issue one interrupt and service two others, one from the load/store assist engine 508 and one from the input/output adapter 506.

Figure 1:
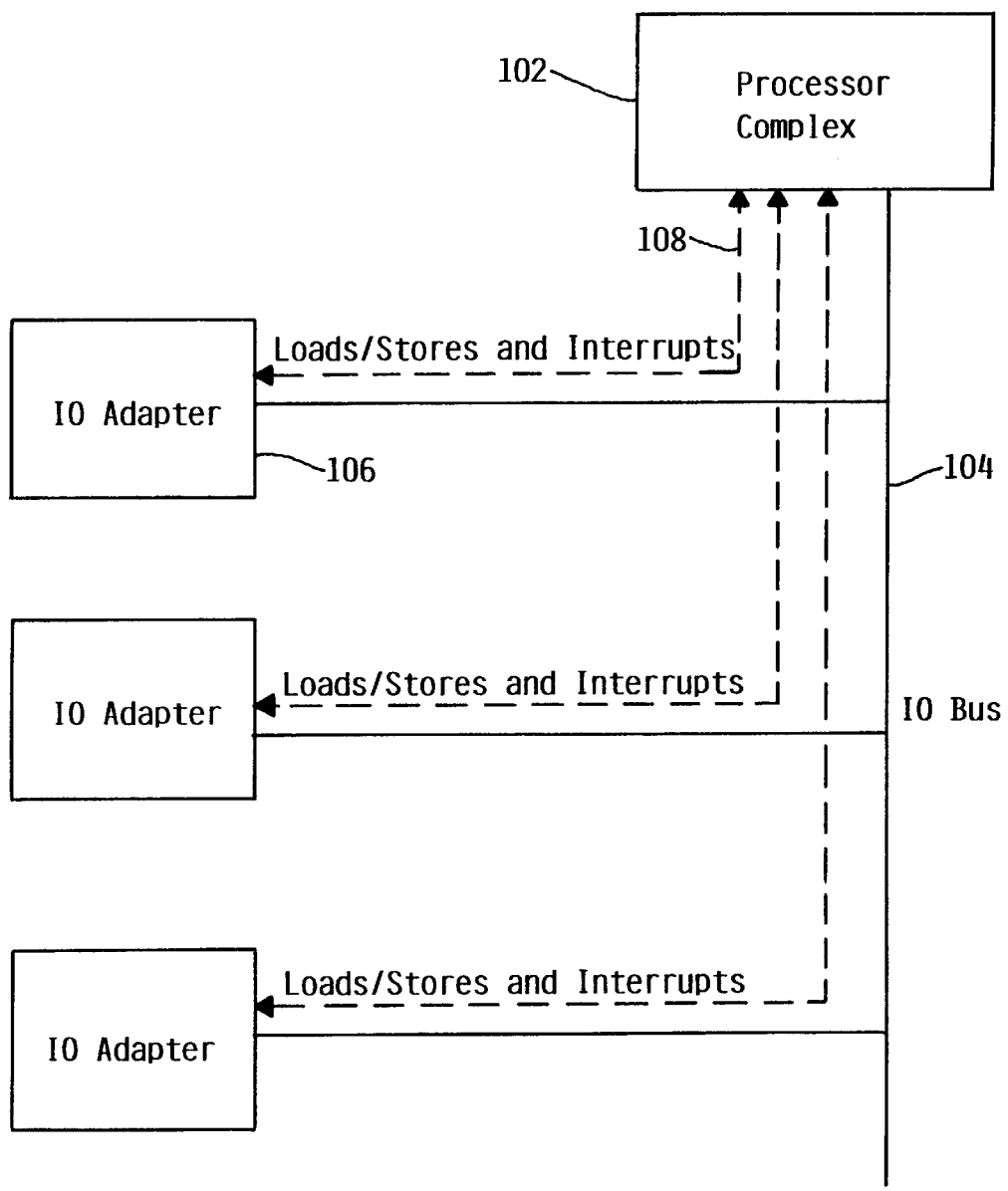
FIG. 1 is a hardware diagram depicting a first prior art input/output processing architecture.
Figure 2:
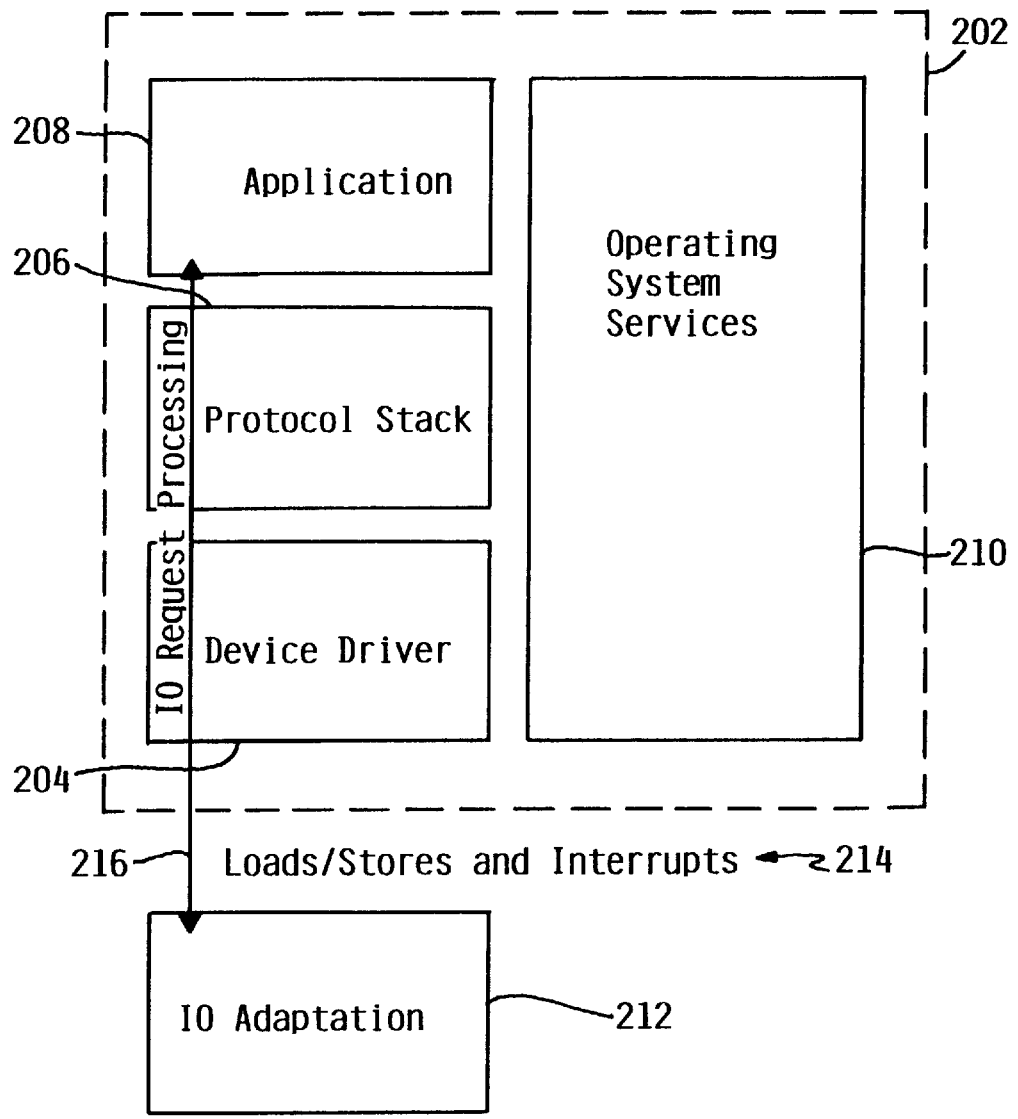
FIG. 2 is a prior art functionality diagram corresponding to FIG. 1.
Figure 3:
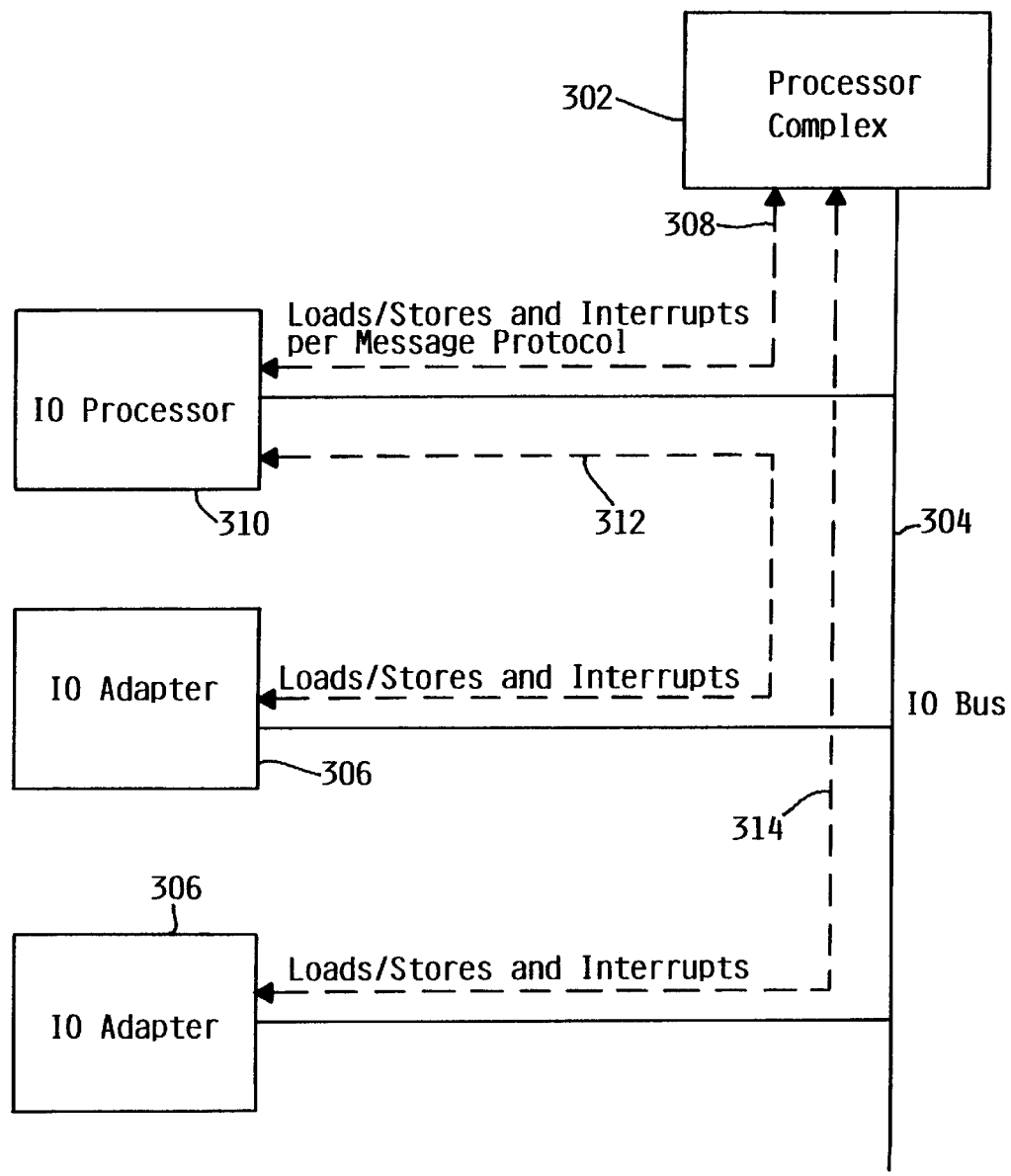
FIG. 3 is a hardware diagram of a second prior art input/output processing architecture.
Figure 4:
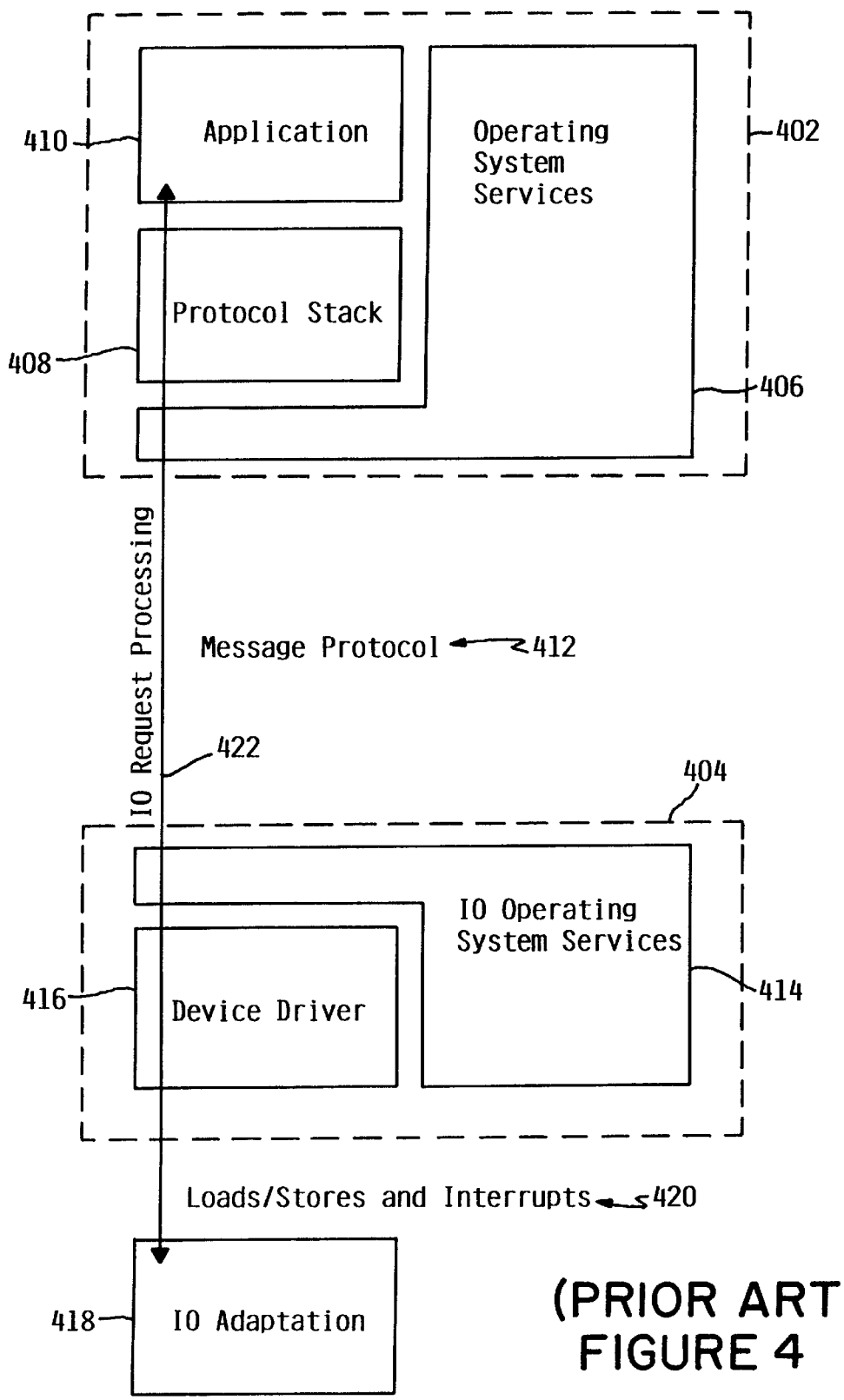
FIG. 4 is a prior art functionality diagram corresponding to FIG. 3.

In contrast to the prior art of FIGS. 1–2 in which the processor complex 102 handles all the input/output processing, the processor complex of the invention, namely 502, must handle an interrupt from the load/store assist engine in addition to the interrupt from the input/output adapter 506. However, the time required for the processor complex 502 to service the additional interrupt is significantly less than the elapsed time during which the processor complex 102 of the prior art FIG. 1 is stalled waiting for the input/output adapter 106 to return data in response to the load command. Moreover, as processor performance increases, the lost time associated with the additional interrupt that must be serviced by the processor complex becomes smaller and smaller. In addition, the time lost to servicing such interrupts, as well as the associated thrashing of the data and instruction caches, can be minimized by batching or grouping the interrupts. Such batching is the subject of related co-pending U.S. patent application Ser. No. 08/950,755, filed Oct. 15, 1997, entitled "Interrupt and Message Batching Apparatus and Method," to Nordstrom et al, the entire contents of Ser. No. 08/950,755 being hereby incorporated by reference.

FIG. 7 is a table listing the functions performed during input/output processing that provides a side-by-side comparison between the prior art and the invention as to which structures perform these functions. Again, the load/store assistance functionality of the invention represents a rethinking of the design considerations in the input/output processing art.

The load/store assist engine of the invention has several advantages over external input/output processing. All of the device driver and protocol stack code runs in one processor rather than two. As a result, it is simpler to adapt/develop the input/output architecture in terms of design, support, development tools such as compilers and debuggers, etc. because single development, rather than dual development, is involved. This permits better utilization of caches. Except the small additional amount of code needed to run the load/store assist engine embedded services, only one set of device drivers and protocol stacks, rather than two, respectively, is required. In addition, this has the advantage that there is a very limited path length in the operating system services needed to perform input/output operations as compared to external input/output processors. The number of instructions necessary to do the desired work, e.g., formatting, etc. is reduced.

Relative to direct input/output processing, i.e., that which is executed entirely by the processor complex, the load/store assist engine of the invention has the advantage that the processor complex does not suffer long latencies associated with accesses to the input/output adapters. As a result, the processor complex is not stalled waiting for a response from an input/output adapter to be completed, making the processor complex available for other work.

In contrast, the load/store assist engine of the invention eliminates the stalled processor cycles in exchange for the few processor complex cycles needed to service the additional interrupt associated therewith. The additional interrupt that must be serviced increases the response time of the processor complex associated with the load/store assist engine, however, the use of the load/store assist engine greatly increases the throughput of the processor complex because of the great many wasted cycles that are eliminated. In the case that a string of load/store commands are sent to the load/store assist engine, the overhead per load/store command is reduced all the more.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An input/output bus architecture comprising:

an input/output bus;

an input/output device connected to said input/output bus;

a main processor, connected to said input/output bus, for executing a device driver corresponding to said input/output device, said device driver generating load/store bus-level commands for said input/output device; and a load/store assist engine, connected to said input/output bus and yet independent of said main processor, for loading data from or storing data to the register space of said input/output device according to said load/store bus-level commands from said device driver such that said load/store assist engine decouples said main processor from latencies associated with execution of said load/store bus-level commands.

2. The architecture of claim 1, wherein said input/output device includes a peripheral device and an input/output adapter for connecting said peripheral device to said input/output bus.

3. The architecture of claim 1, wherein said load/store assist engine is a programmed processor.

4. The architecture of claim 1, wherein said load/store assist engine is a programmable logic array.

5. The architecture of claim 1, wherein:

said input/output bus is a first input/output bus;

said architecture further comprises a second input/output bus and a host-bridge for interfacing said first input/output bus to said second input/output bus; and said host-bridge and said load/store assist engine are integrated as a single device.

6. The architecture of claim 5, wherein said second input/output bus is different than said first input/output bus.

7. The architecture of claim 1, wherein:

said input/output device is a first input/output device and said device driver is a first device driver;

said architecture further comprises a second input/output device;

said main processor is operable to execute a second device driver, corresponding to and generating bus-level load/store commands for said second input/output device; and said load/store assist engine is operable to load/store data to/from said second input/output device according to said bus-level load/store commands from said second device driver.

8. The architecture of claim 1, wherein said input/output bus is a memory-mapped bus.

9. The architecture of claim 8, wherein said input/output bus is a PCI bus.

10. The architecture of claim 1, wherein said main processor also is operable to execute an operating system thereof.

11. The architecture of claim 10, wherein said main processor also is operable to execute a protocol stack.

12. The architecture of claim 11, wherein said main processor also is operable to execute an application program.

13. The architecture of claim 10, wherein said operating system is operable to select access of an input/output adapter by a direct path between said main processor and a peripheral device or via an indirect path that includes said load/store assist engine such that said operating system makes the selection independently of said device driver.

14. The architecture of claim 1, wherein said load/store assist engine and said main processor communicate over said input/output bus using a messaging protocol.

15. The architecture of claim 1, wherein said load/store assist engine is also independent of said input/output device.

16. The architecture of claim 15, wherein said load/store assist engine is operable to generate an interrupt signal to said main processor when execution of a unit of one or more bus-level commands is complete.

* * * * *